United States Patent
Iyer et al.

(10) Patent No.: US 11,003,488 B2
(45) Date of Patent: May 11, 2021

(54) MEMORY-FABRIC-BASED PROCESSOR CONTEXT SWITCHING SYSTEM

(71) Applicant: Dell Products L.P., Round Rock, TX (US)

(72) Inventors: Shyamkumar T. Iyer, Austin, TX (US); William Price Dawkins, Lakeway, TX (US); Kurtis John Bowman, Austin, TX (US); Jimmy Doyle Pike, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/402,904

(22) Filed: May 3, 2019

(65) Prior Publication Data

US 2020/0348962 A1  Nov. 5, 2020

(51) Int. Cl.
| | | |
|---|---|---|
| *G06F 13/12* | (2006.01) | |
| *G06F 9/46* | (2006.01) | |
| *G06F 9/30* | (2018.01) | |
| *G06F 3/06* | (2006.01) | |
| *G06F 15/173* | (2006.01) | |

(52) U.S. Cl.
CPC ............ *G06F 9/461* (2013.01); *G06F 3/0607* (2013.01); *G06F 3/0646* (2013.01); *G06F 9/30123* (2013.01); *G06F 15/17381* (2013.01); *G06F 3/0683* (2013.01)

(58) Field of Classification Search
CPC ...... G06F 9/461; G06F 3/0607; G06F 3/0646; G06F 9/30123; G06F 15/17381; G06F 3/0683
See application file for complete search history.

(56) References Cited

U.S. PATENT DOCUMENTS

| | | | |
|---|---|---|---|
| 6,101,599 A | 8/2000 | Wright et al. | |
| 6,173,386 B1 | 1/2001 | Key et al. | |
| 6,408,325 B1 | 6/2002 | Shaylor | |
| 8,693,343 B2 * | 4/2014 | Nakagawa | ............... H04L 12/18 370/241 |
| 10,764,364 B2 * | 9/2020 | Lou | ...................... H04L 67/2842 |
| 2018/0373553 A1 * | 12/2018 | Connor | ............... G06F 9/45558 |

* cited by examiner

*Primary Examiner* — Cheng Yuan Tseng
(74) *Attorney, Agent, or Firm* — Haynes and Boone, LLP (57) ABSTRACT

A memory-fabric-based processor context switching system includes server devices coupled to a memory fabric. A first processing system in a first server device receives a request to move a process it is executing and, in response, copies first processing system context values to its first local memory system in the first server device, and generates a first data mover instruction that causes a first data mover device in the first server device to transmit the first processing system context values from the first local memory system to the memory fabric. A second processing system in a second server device generates a second data mover instruction that causes a second data mover device in the second server device to retrieve the first processing system context values from the memory fabric and provide the first processing system context values in a second local memory system included in the second server device.

14 Claims, 10 Drawing Sheets

MEMORY-FABRIC-BASED PROCESSOR CONTEXT SWITCHING SYSTEM

BACKGROUND

The present disclosure relates generally to information handling systems, and more particularly to switching context between processing systems via a memory fabric.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In information handling systems such as, for example, server devices, it may be desirable in some cases to provide for the switching of a processor context between processors. As would be understood by one of skill in the art, processor context switching may include the operation of transferring processor context values included in the registers in a first processor to registers in a second processor so that a process, thread, or other processing result being provided by the first processor may be provided by the second processor. However, conventional processor context switching performed in server devices that utilize the von Neumann architecture requires the processor(s) to perform read, copy, write, transfer, and/or other context switching operations that utilize relatively valuable processing cycles on what is a relatively mundane data transfer operation. For example, such operations may include a first processor stopping a process or thread running on the first processor, storing the processor context values for the first processor in a local memory provided for the first processor, and transmitting the processor context values for the first processor from the local memory that is provided for the first processor to the second processor, with the second processor storing the processor context values for the first processor in a local memory provided for the second processor, loading the processor context values for the first processor from the local memory provided for the second processor and into the second processor, and using the processor context values (e.g., instruction pointer information included in the processor context values) to resume the process or thread at the point at which it was stopped on the first processor.

Accordingly, it would be desirable to provide an improved processor context switching system.

SUMMARY

According to one embodiment, an Information Handling System (IHS) includes a memory system; a processing system that is coupled to the memory system and that is configure to receive a first request to move a first process executing on the processing system and, in response: copy first processing system context values to the memory system; and generate a first data mover instruction to transmit the first processing system context values to a memory fabric; and a data mover device that is configured to receive the first data mover instruction generated by the processing system and, in response, transmit the first processing system context values from the memory system to the memory fabric.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
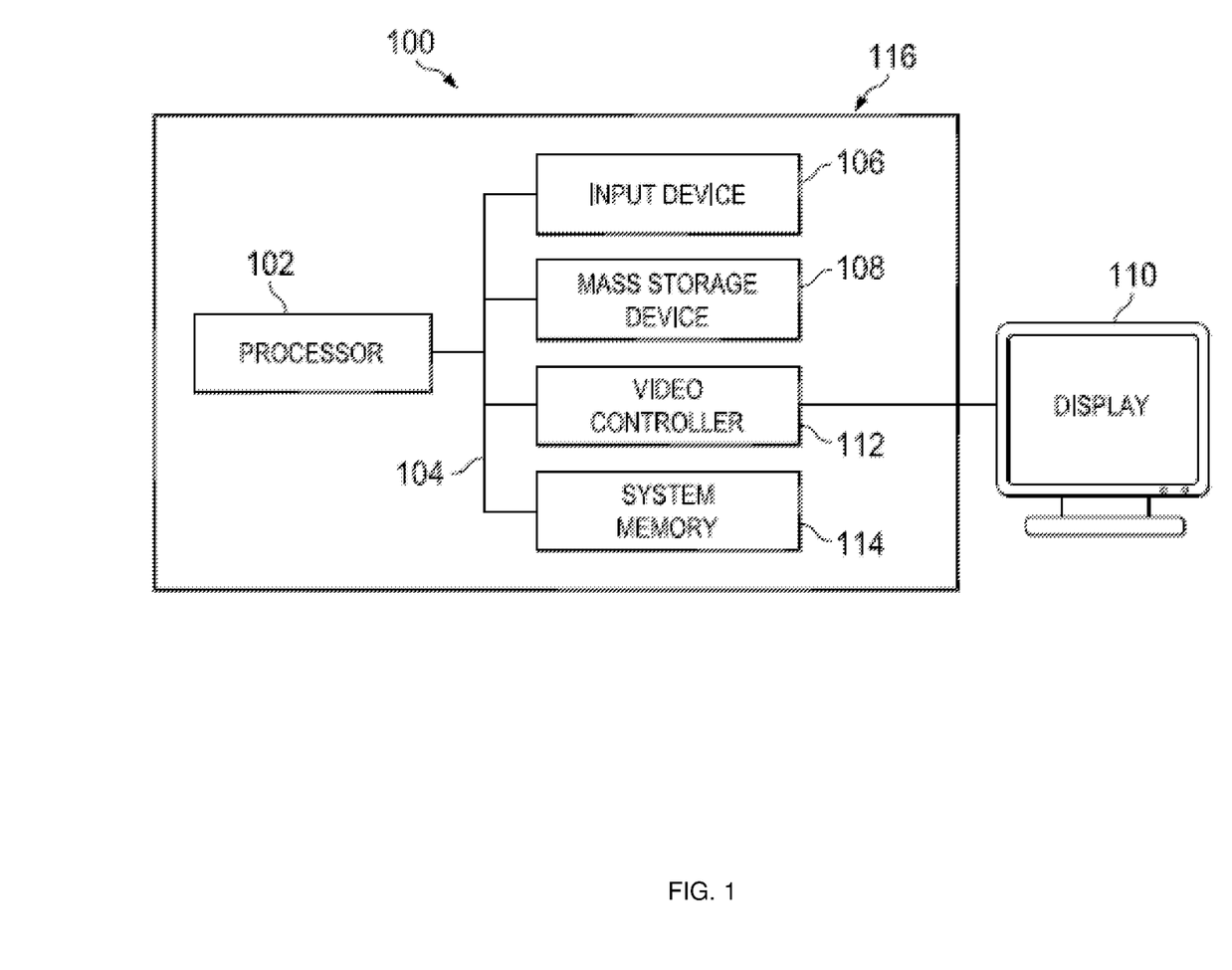
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
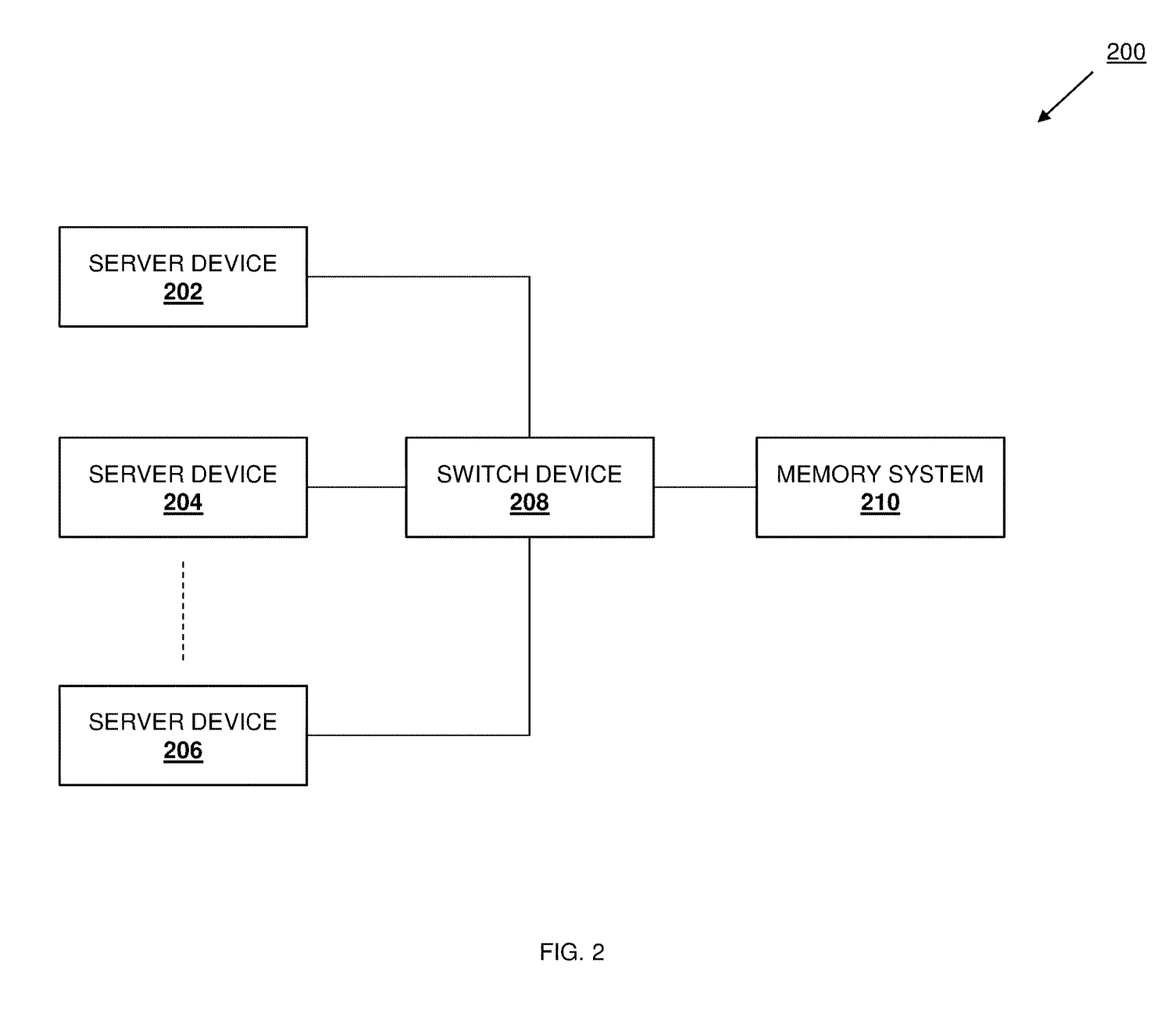
FIG. 2 is a schematic view illustrating an embodiment of networked system including server devices coupled to a memory fabric.

Referring now to FIG. 2, an embodiment of a networked system 200 is illustrated. In the illustrated embodiment, the networked system 200 includes a plurality of server devices 202, 204, and up to 206. In an embodiment, any or all of the server devices 202, 204, and 206 may be provided by the IHS 100 discussed above with reference to FIG. 1, and/or may include some or all of the components of the IHS 100. However, while illustrated and discussed as server devices, one of skill in the art in possession of the present disclosure will recognize that the server devices 202, 204, and 206 provided in the networked system 200 may include any devices that may be configured to operate similarly as discussed below. While only three server devices 202, 204, and 206 are illustrated and discussed below, one of skill in the art in possession of the present disclosure will recognize that many more server devices may (and typically will) be provided in the networked system 200 (e.g., a datacenter) while remaining within the scope of the present disclosure.

In the Illustrated embodiment, the server devices 202, 204, and 206 are each coupled to a switch device 208 (e.g., via a network that may be provided in the networked system 200 by, for example, a Local Area Network (LAN), the Internet, and/or any other network (or combination of networks) that would be apparent to one of skill in the art in possession of the present disclosure.) In an embodiment, the switch device 208 may be provided by the IHS 100 discussed above with reference to FIG. 1, and/or may include some or all of the components of the IHS 100. In a specific example, the switch device 208 may be provided by a Gen-Z switch device that has been configured to provide the memory fabric processor context and data movement functionality discussed below. While discussed herein as being a switch device, one of skill in the art in possession of the present disclosure will recognize that the switch device 208 may be replaced with a bridge device and/or other devices with similar functionality while remaining within the scope of the present disclosure as well. Furthermore, the illustrated embodiment of the networked system 200 includes a memory system 210 that is coupled to the server devices 202, 204, and 206 via the switch device 208. In an embodiment, the memory system 210 may be provided by the IHS 100 discussed above with reference to FIG. 1, and/or may include some or all of the components of the IHS 100. In specific examples, the memory system 210 may be provided by one or more separate server devices, as a logical portion of one or more of the server devices 202, 204, and 206, and/or in a variety of other manners that would be apparent to one of skill in the art in possession of the present disclosure. In the embodiments discussed below, the memory system 210 provides a network-connected memory fabric that may be utilized by any of the server devices 202, 204, and 206 via the switch device 208.

For example, the network-connected memory fabric may be a Generation Z (Gen-Z) memory fabric created and commercialized by the Gen-Z consortium, and which one of skill in the art in possession of the present disclosure will recognize extends the processing system/memory system byte-addressable load/store model to the entire networked system 200 by decoupling the processing system/compute functionality in the server devices 202, 204, and 206 from the memory system/media functionality in the memory system 210, allowing processing systems and memory system to act as peers that communicate using the same language via simplified, high performance, low latency communication paths that do not incur the translation penalties and software overhead in conventional systems, thus eliminating bottlenecks and increasing efficiency via the unification of communication paths and simplification of software required for processing system/memory system communications. However, one of skill in the art in possession of the present disclosure will recognize that other types of memory fabrics will fall within the scope of the present disclosure as well. Furthermore, the server devices 202, 204, and 206 are illustrated as each coupled to the memory system 210 via the switch device 208, one of skill in the art in possession of the present disclosure will recognize that in other embodiments the switch device 208 and the memory system 210 may be provided in a server device to enable the functionality described below while remaining within the scope of the present disclosure as well. As such, while a specific networked system 200 has been illustrated and described, one of skill in the art in possession of the present disclosure will recognize that the memory-fabric-based processor context switching system of the present disclosure may utilize a variety of other components and component configurations while remaining within the scope of the present disclosure as well.

Figure 3:
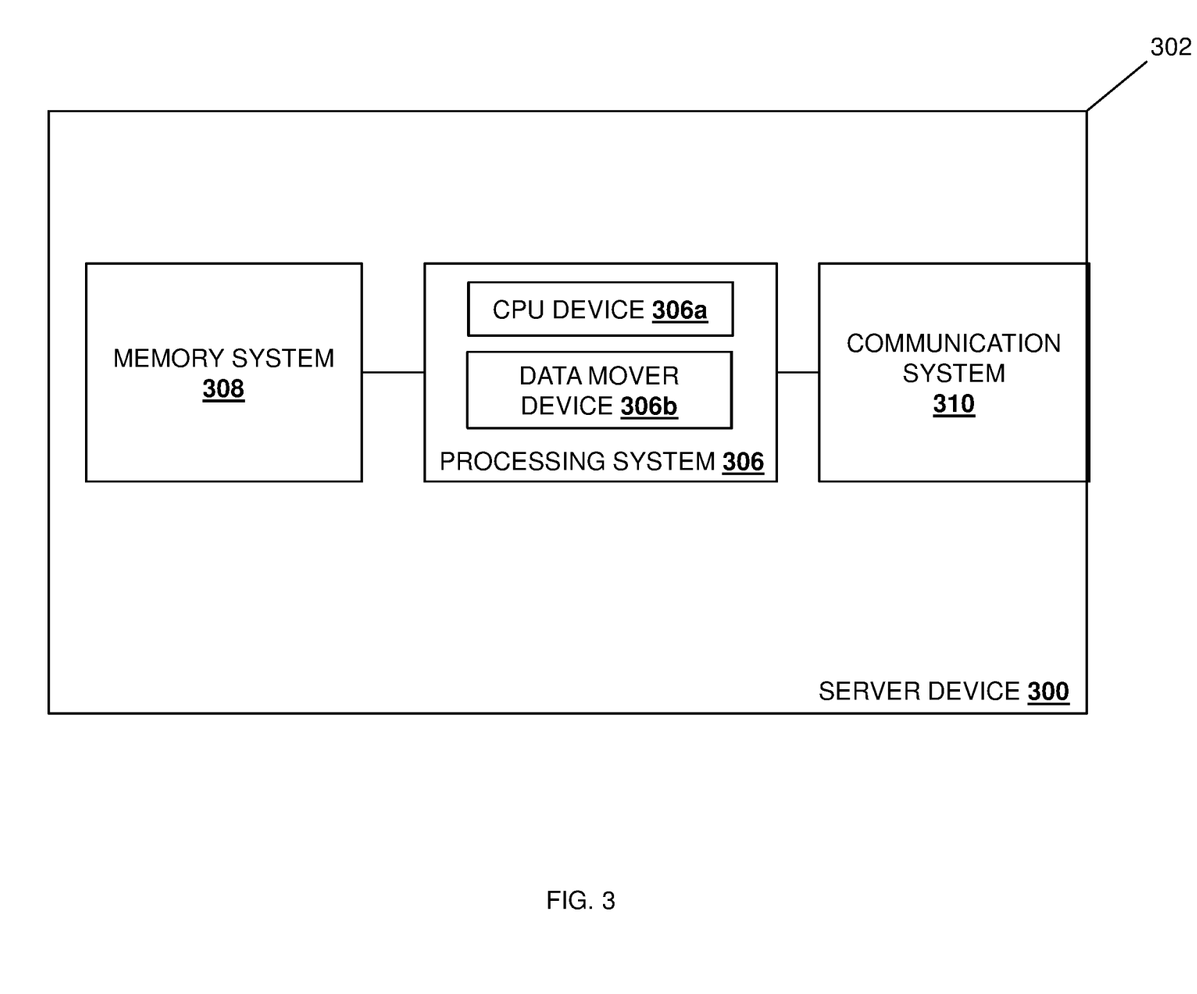
FIG. 3 is a schematic view illustrating an embodiment of a server device that may be provided in the networked system of FIG. 2.

Referring now to FIG. 3, an embodiment of a server device 300 is illustrated that may provide any or all of the server devices 202-26 discussed above with reference to FIG. 2. As such, the server device 300 may be provided by the IHS 100 discussed above with reference to FIG. 1 and/or may include some or all of the components of the IHS 100. Furthermore, while illustrated and discussed as a server device 300, one of skill in the art in possession of the present disclosure will recognize that the functionality of the server device 300 discussed below may be provided by other devices that are configured to operate similarly as discussed below. In the illustrated embodiment, the server device 300 includes a chassis 302 that houses the components of the server device 300, only some of which are illustrated below.

In the illustrated embodiment, the chassis 302 houses a processing system 306 that includes a Central Processing Unit (CPU) device 306a that may be provided by the processor 102 discussed above with reference to FIG. 1. For example, the CPU device 306a may include a plurality of CPU cores, any or all of which are configured to perform the functionality of the CPU device 306a discussed below. However, as discussed below, the processing system 306 may instead include Graphics Processing Unit (GPU) devices, accelerator devices, and/or other types of processing devices in place of the CPU device 306a while remaining within the scope of the present disclosure as well.

As discussed below, the CPU device 306a may include a plurality of registers and/or any other processing system context value storage element that would be recognize by one of skill in the art in possession of the present disclosure as providing for the storage of processing system context values utilized in providing a process, thread, and/or other processing system result. In a specific example, the CPU device registers/context value storage elements may include an instruction pointer (IP) context value storage element; general purposes registers that include an accumulator (AX) register, a base (BX) register, a counter (CX) register, a data (DX) register, a stack pointer (SP) register, a stack base pointer (BP) register, a source index (SI) register, a destination index (DI) register; segment registers that include a stack segment (SS) register, a code segment (CS) register, a data segment (DS) register, an extra segment (ES) register, an F segment (FS) register, a G segment (GS) register; a flags (EFLAGS) register; and/or a variety of other registers/context value storage elements that would be apparent to one of skill in the art in possession of the present disclosure. Furthermore, one of skill in the art in possession of the present disclosure will recognize that the examples of registers/context value storage elements discussed above that may store the processing system context values utilized by the present disclosure are specific to CPU devices, and that the GPU devices, accelerator devices, and/or other processing devices discussed above utilize different registers/context value storage elements that store different context values, and the use of those different types of processing devices with their different registers/context value storage elements and different context values will fall within the scope of the present disclosure as well.

In the illustrated embodiment, the processing system 306 also includes a data mover device 306b. For example, the data mover device 306b may be provided by a data mover processing system (not illustrated, but which may include the processor 102 discussed above with reference to FIG. 1) and a data mover memory system (not illustrated, but which may include the memory 114 discussed above with reference to FIG. 1) that is coupled to the data mover processing system and that includes instructions that, when executed by the data mover processing system, cause the data mover processing system to provide a data mover engine that is configured to perform the functionality of the data mover engines and/or data mover devices discussed below. In the illustrated embodiment, the data mover device 306b is integrated with, included in, and/or otherwise part of the processing system 306 and, as such, the data mover device 306b may be provided by instructions on a local memory system in the server device 300 that is utilized by a CPU-device-independent processing element in the processing system 306, provided as an FPGA that is part of the processing system 306, and/or provided in a variety of manners that would be apparent to one of skill in the art in possession of the present disclosure. However, the data mover device may be provided by separate data mover hardware and software (e.g., a Field Programmable Gate Array (FPGA) provided on a Peripheral Component Interconnect express (PCIe) card that is coupled to the processing system 306 via a PCIe connector, and/or other subsystem known in the art) that is coupled to the processing system (either within the server device 300 or outside the server device 300) while remaining within the scope of the present disclosure as well.

In some embodiments, in addition to the processing system context movement operations discussed below, the data mover device 306b may be configured to perform read, write, copy, and/or other data movement operations for the processing system 306 (e.g., to and from its local memory system) in order to, for example, relieve the processing system 306 from having to use processing cycles to perform those operations. However, one of skill in the art in possession of the present disclosure will recognize that the functionality of the data mover device 306b discussed below may be provided by itself and/or with other functionality while remaining within the scope of the present disclosure as well. While a few examples of data mover device implementations and functionality have been described, one of skill in the art in possession of the present disclosure will recognize that the a variety of different functionality for the data mover device 306 may be enabled in a variety of manners that will fall within the scope of the present disclosure as well.

In the illustrated embodiment, the chassis 302 also houses a memory system 308 (which may include the memory 114 discussed above with reference to FIG. 1) that is coupled to the processing system 306 and that may include instructions that, when executed by the processing system 306, cause the processing system 306 to provide any of the processing system functionality discussed below. As illustrated, the chassis 302 may also house a communication system 310 that is coupled to the processing system 306 (e.g., via a coupling between the communication system 310 and the processing system 306) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
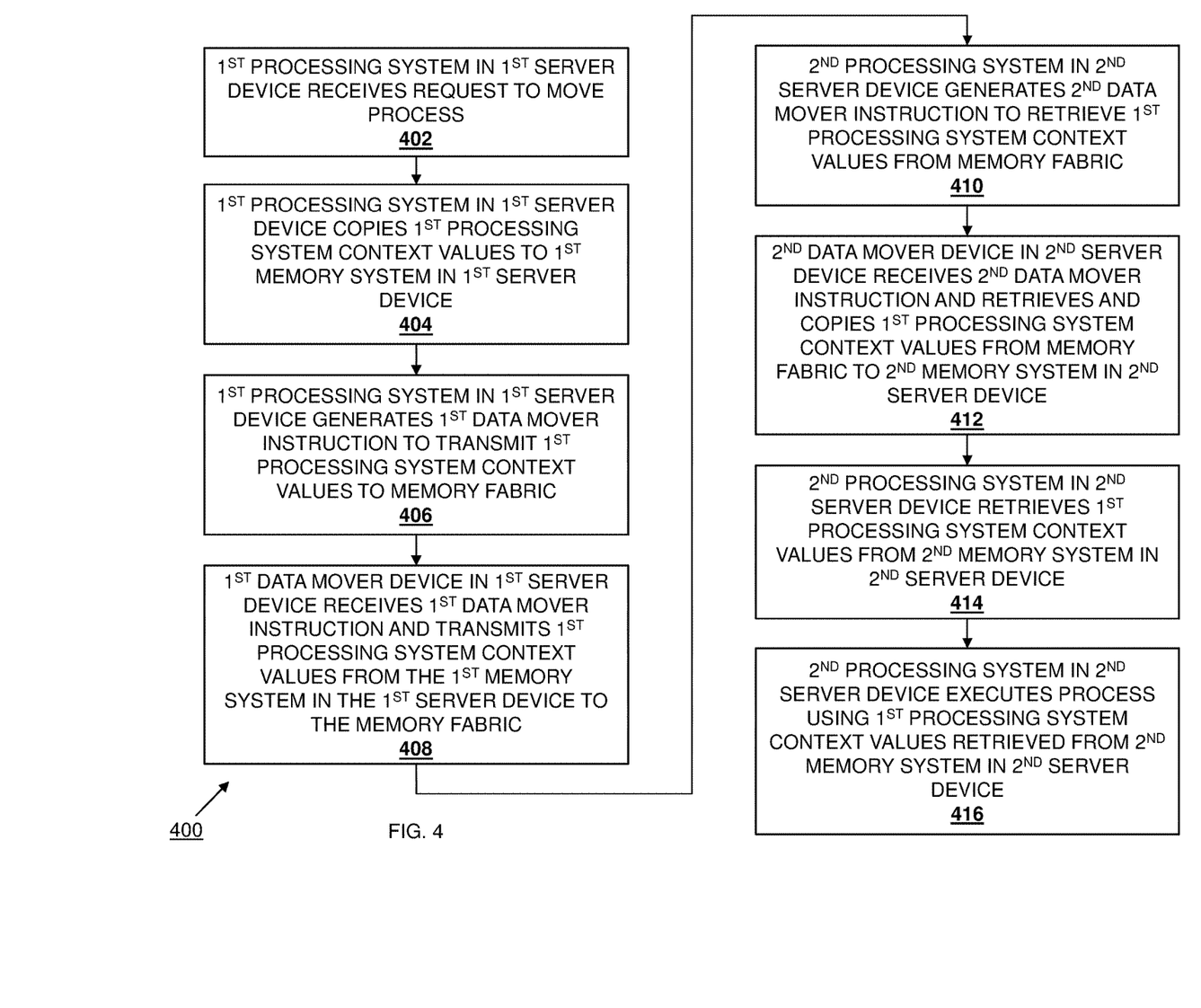
FIG. 4 is a flow chart illustrating an embodiment of a method for switching processor context via a memory fabric.

Referring now to FIG. 4, an embodiment of a method for switching a processor context between processing systems via a memory fabric is illustrated. As discussed below, the systems and methods of the present disclosure provide for the switching of a processing system context between processing systems by a data mover device and via a memory fabric. For example, a first processing system may be executing a process, and a request to move that process to a second processing system may be received. In response, the first processing system may copy its first processing system context values to a first local memory system provided for the first processing system, and generate a first data mover instruction to transmit the first processing system context values to a memory fabric. A first data mover device may receive the first data mover instruction and, in response, may transmit the first processing system context values from the first memory system to the memory fabric. A second processing system may then generate a second data mover instruction to retrieve the first processing system context values from the memory fabric, and a second data mover device may receive the second data mover instruction and, in response, may retrieve the first processing system context values from the memory fabric and copy the first processing system context values to a second memory system provided for the second processing system. The second processing system may then retrieve the first processing system context values from the second memory system, and use the first processing system context values to execute the process. As such, processing system context switching is provided between processing systems via a memory fabric by data mover device(s) that offload many of the processing system context switching operations from the processing systems, thus providing for improved processing system context switching.

Figure 5A:
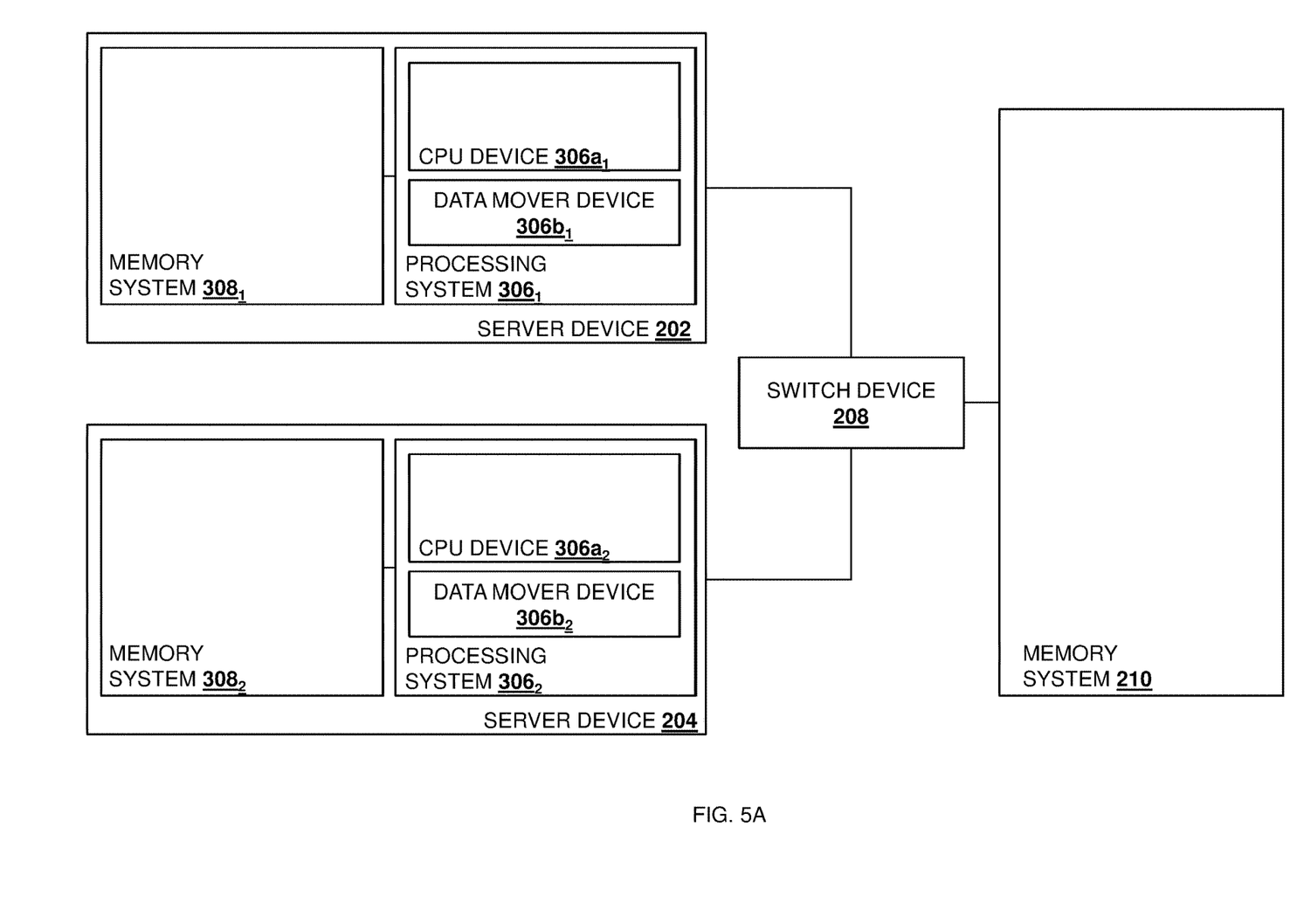
FIG. 5A is a schematic view illustrating an embodiment of the memory-fabric-based processor context switching system of the present disclosure provided by server devices like that illustrated in FIG. 3 in the networked system of FIG. 2.

The method 400 begins at block 402 where a first processing system in a first server device receives a request to move a process. In an embodiment, at block 402, any of the server devices 202-206 may be providing/executing a process, thread, or other similar processing system action (referred to below as a "process") and may receive a request to move that process such that it may be provided by another processing system. With reference to FIG. 5A, an embodiment of the memory-fabric-based processor context switching system of the present disclosure provided by server devices like that illustrated in FIG. 3 in the networked system of FIG. 2 is illustrated, with the CPU device $306a_1$ that is included the processing system $306_1$ in the server device 202 operating to provide/execute a process (e.g., via instructions stored in the memory system $308_1$) at block 402, and receiving the request to move that process to the processing system $306_2$ included in the server device 204. However, while processing systems in two particular server devices 202 and 204 are discussed as moving a process (as well as processing system context values) between them, one of skill in the art in possession of the present disclosure will recognize that processes and associated processing system context values may be moved between any two processing systems, from a first processing system to multiple second processing systems, and/or in any other combination that would be apparent to one of skill in the art in possession of the present disclosure. Furthermore, while the process (as well as processing system context values) is discussed as being moved between processing systems in two different server devices 202 and 204, one of skill in the art in possession of the present disclosure will recognize that processes and processing system context values may be moved between processing systems in the same server device while remaining within the scope of the present disclosure as well.

Figure 5B:
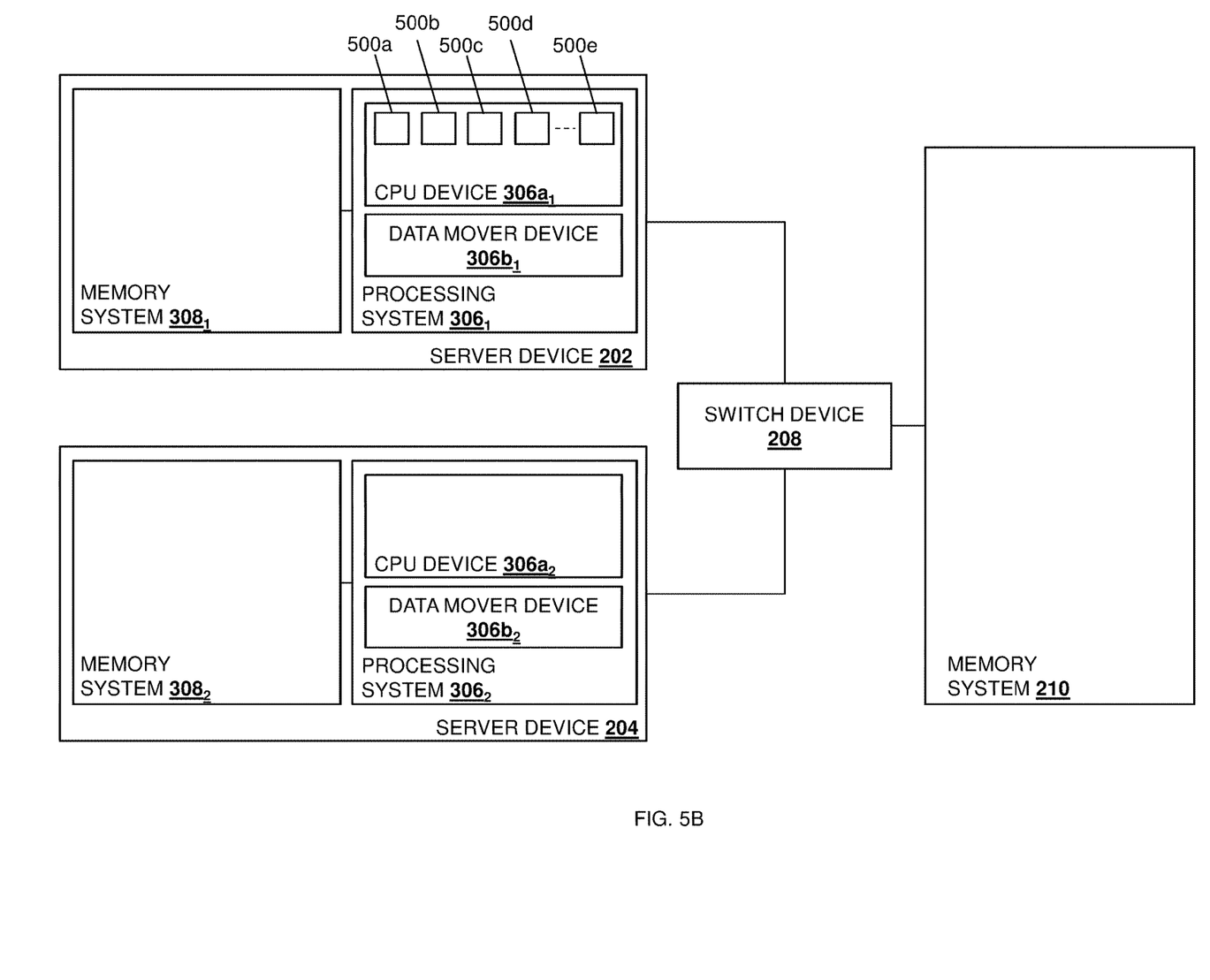
FIG. 5B is a schematic view illustrating an embodiment of the memory-fabric-based processor context switching system of FIG. 5A operating during the method of FIG. 4.

With reference to FIG. 5B, the CPU device $306a_1$ in the processing system $306_1$ is illustrated with a plurality of processing system context values 500a, 500b, 500c, 500d, and up to 500e, any or all of which may be utilized by the CPU device $306a_1$ and/or the processing system $306_1$ in order to execute and/or otherwise provide the process at block 402. As such, continuing with the CPU-specific example discussed above, the processing system context values 500a-500e may be provided in the CPU device registers/context value storage elements discussed above and thus may include an instruction pointer (IP) context value, an accumulator (AX) context value, a base (BX) context value, a counter (CX) context value, a data (DX) context value, a stack pointer (SP) context value, a stack base pointer (BP) context value, a source index (SI) context value, a destination index (DI) context value, a stack segment (SS) context value, a code segment (CS) context value, a data segment (DS) context value, an extra segment (ES) context value, an F segment (FS) context value, a G segment (GS) context value, a flags (EFLAGS) context value, and/or a variety of other context values that would be apparent to one of skill in the art in possession of the present disclosure.

As such, at block 402, the processing system $306_1$ in the server device 202 may receive a request to move a process currently being executed by the CPU device $306a_1$ in that processing system $306_1$. For example, the request to move the process received by the processing system $306_1$ at block 402 may include a kernel-based context switch request that may, for example, result from a need by the process being executed by the CPU device $306a_1$ for privileges that are not available when that process is being provided by a first operating system kernel via its execution by the CPU device $306a_1$, but that will be available when the process is provided by a second operating system kernel via its execution by the CPU device $306a_2$ in the processing system $306_2$ included in the server device 204. In another example, the request to move the process received by the processing system $306_1$ at block 402 may include a thread-container context switch request that may, for example, provide for the moving of a thread context between containers (e.g., from one thread context to another thread context in a logical server device that shares the same operating system kernel.)

In another example, the request to move the process received by the processing system $306_1$ at block 402 may include a thread-Virtual Machine (VM) context switch request that may, for example, provide for the moving of a thread context between virtual machines (e.g., from a first thread context in a first virtual machine to a second thread context in a second virtual machine, each running in a virtualization server device with a common hypervisor.) In yet another example, the request to move the process received by the processing system $306_1$ at block 402 may include a Virtual Machine (VM)-server device context switch request that may, for example, provide for the moving of a virtual machine between server devices (e.g., moving a virtual machine context from a first server device to a second server device, sometimes referred to as "live migration".) However, while several specific examples have been provided, one of skill in the art in possession of the present disclosure will recognize that the request to move the process received at block 402 may include a variety of requests provided for a variety of process movement requirements that would be apparent to one of skill in the art in possession of the present disclosure.

Figure 5C:
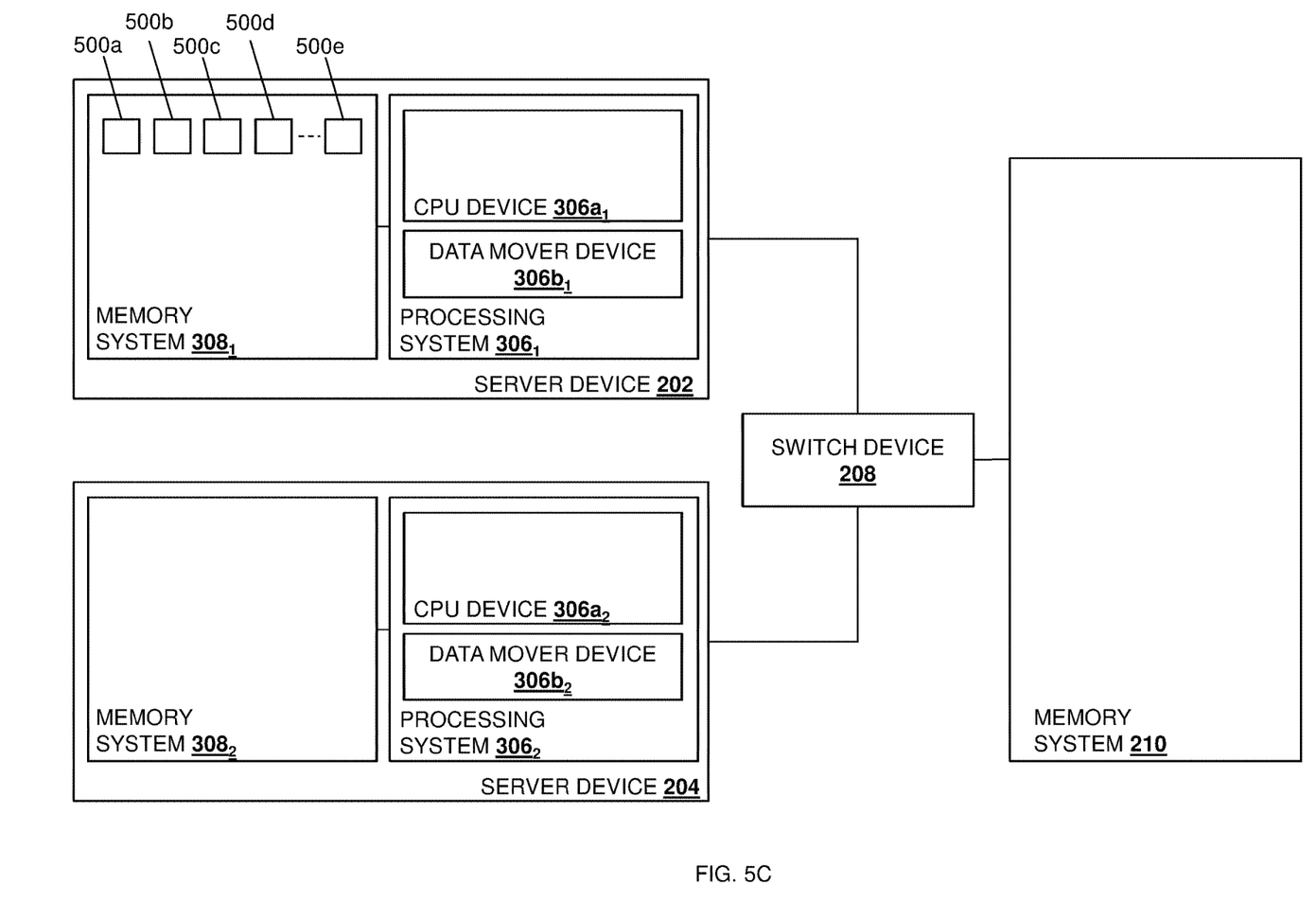
FIG. 5C is a schematic view illustrating an embodiment of the memory-fabric-based processor context switching system of FIG. 5A operating during the method of FIG. 4.

The method 400 then proceeds to block 404 where the first processing system in the first server device copies first processing system context values to a first memory system in the first server device. As illustrated in FIG. 5C, at block 404 and in response to receiving the request to move the process it is currently executing, the processing system $306_1$ may operate to copy the processing system context values 500a-500e provided in the CPU device registers/context value storage elements in the CPU device $306a_1$ to the memory system $308_1$. For example, at block 404, the CPU device $306a_1$ may operate to stop the execution of the process for with the move request was received at block 402, access its CPU device registers/context value storage elements, identify the processing system context values 500a-

500e stored therein, and copy those processing system context values 500a-500e to the memory system $308_1$. In specific examples when the data mover device is tightly integrated with the CPU device, a push primitive instruction may cause the context data to be flushed from the CPU registers directly to local memory or memory fabric. In another specific example in which the data mover device cannot cause a flush of the context data from the CPU registers, the CPU device may cause a flush of the context data via a CPU instruction to the local memory (e.g., the flush may initially be performed to local memory for speed reasons), which may be followed by a push primitive instruction (e.g., when the data mover device is provided outside the CPU package) that may move the context data from the local memory to the memory fabric. As such, the processing system context values 500a-500e copied to the memory system $308_1$ may describe the state of the CPU device $306a_1$ and/or the process being executed by the CPU device $306a_1$ at the time that process was stopped.

The method 400 then proceeds to block 406 where the first processing system in the first server device generates a first data mover instruction to transmit the first processing system context values to a memory fabric. In an embodiment, at block 406, the processing system $306_1$ may operate to generate a first data mover instruction for the data mover device $306b_1$ that includes instructions to transmit the first processing system context values 500a-500e, which were copied to the memory system $308_1$, to the memory system 210 that provides the memory fabric in the networked system 200. In a specific example, the first data mover instruction may be generated by the CPU device $306a_1$ and may include a primitive instruction or other microarchitecture control signal such as, for example, a push primitive instruction that may be provided as an enhancement to an Instruction Set Architecture (ISA) utilized by the processing system $306_1$ and the data mover device $306b_1$, although one of skill in the art in possession of the present disclosure will recognize that other first data mover instructions will fall within the scope of the present disclosure as well. Furthermore, in some embodiments of block 406, the processing system $306_1$ may provide instruction(s) for the data mover device $306b_1$ to transmit process data that was utilized by the CPU device $306a_1$ in providing the process from the memory system $308_1$ to the memory system 210 that provides the memory fabric in the networked system 200. As such, in some embodiments, at block 406 the processing system $306_1$ may provide one or more instructions to the data mover device $306b_1$ to move process data (sometimes referred to as "working data") and processing system context data from the memory system $308_1$ to the memory system 210/memory fabric at substantially the same time.

Figure 5D:
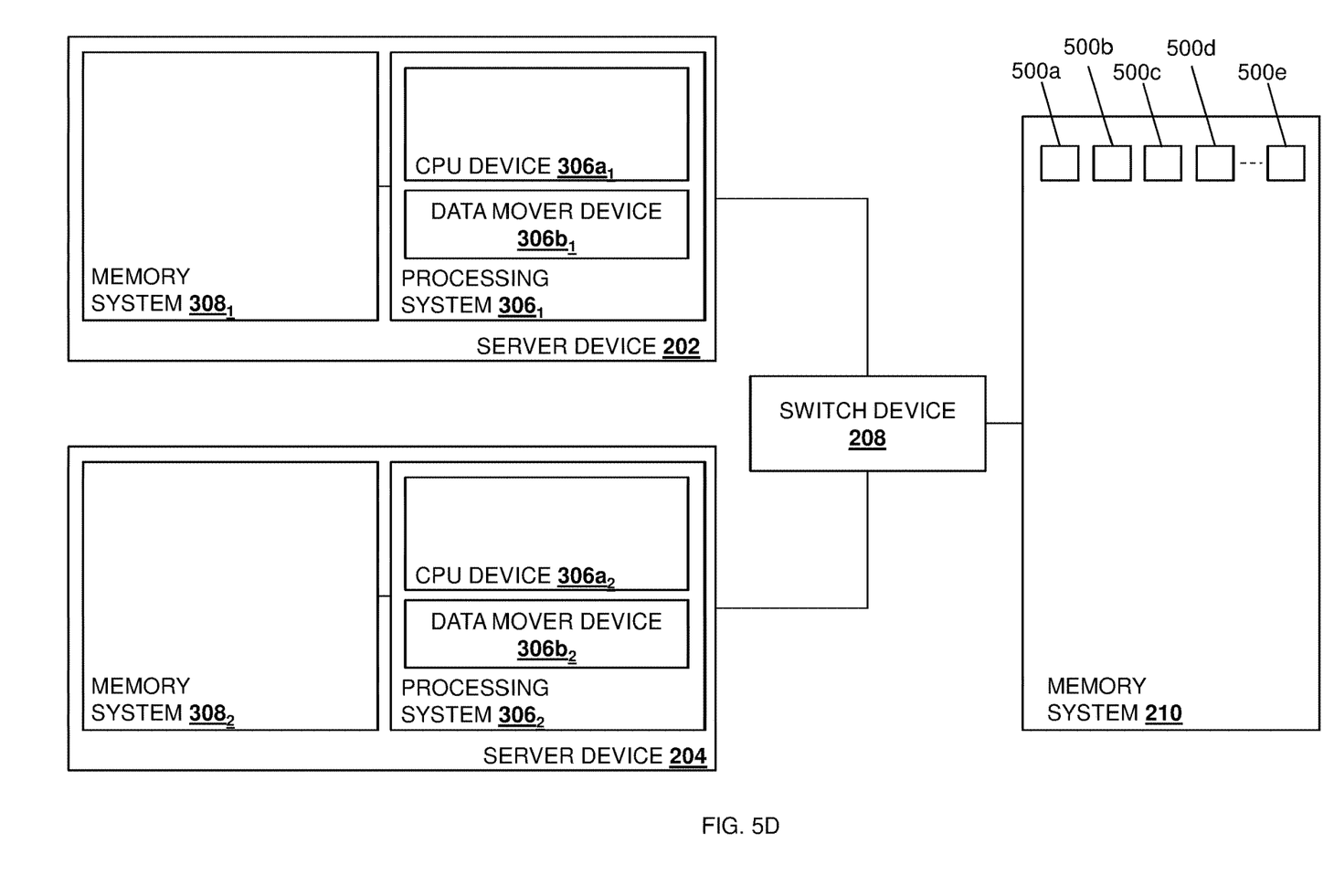
FIG. 5D is a schematic view illustrating an embodiment of the memory-fabric-based processor context switching system of FIG. 5A operating during the method of FIG. 4.

The method then proceeds to block 408 where a first data mover device in the first server device receives the first data mover instruction and transmits the first processing system context values from the first memory system in the first server device to the memory fabric. As illustrated in FIG. 5D, in an embodiment of block 408, the data mover device $306b_1$ may receive the first data mover instruction generated by the processing system $306_1$ at block 406 and, in response, may transfer the first processing system context values 500a-500e from the memory system $308_1$ to the memory system 210 that provides the memory fabric. For example, the data mover device $306b_1$ may receive the primitive instruction or other microarchitecture control signal (e.g., the push primitive instruction that may be provided as an enhancement to an Instruction Set Architecture (ISA) utilized by the processing system $306_1$ and the data mover device $306b_1$ discussed above) and, in response, may copy the first processing system context values 500a-500e from the memory system $308_1$, and then transmit those first processing system context values 500a-500e to the switch device 208 for storage in the memory system 210. In some embodiments, at block 408 the CPU device $306a_1$ may issue push primitive (e.g., equivalent to a cache flush instruction (e.g., "clflush")) to the data mover device $306b_1$ that causes the data mover device $306b_1$ to move data from the memory system $308_1$ (which in this example is being treated like a cache identified in the cache flush instruction) to the memory system 210 that provides the memory fabric. As discussed above, depending on how tightly the data mover device is integrated with the CPU, the data mover device may flush the context data from CPU registers to the memory fabric directly, or from local memory to the memory fabric (which as discussed above may include the CPU device explicitly flushing the register state to local memory before invoking the data mover device.)

Furthermore, as discussed above, in some embodiments of block 408, the data mover device $306b_1$ may receive instructions from the processing system $306_1$ to transmit process data that was utilized by the CPU device $306a_1$ in providing the process from the memory system $308_1$ to the memory system 210 that provides the memory fabric in the networked system 200 and, in response, may copy the process data from the memory system $308_1$ and then transmit that process data to the switch device 208 for storage in the memory system 210. As such, in some embodiments, at block 408 the data mover device $306b_1$ may move process data (sometimes referred to as "working data") and processing system context data from the memory system $308_1$ to the memory system 210/memory fabric at substantially the same time.

While the processing system $306_1$ is described as copying the first processing system context values 500a-500e to the memory system $308_1$ at block 404, and the data mover device $306b_1$ is discussed as transferring the first processing system context values 500a-500e from the memory system $308_1$ to the memory system 210 that provides the memory fabric, in some embodiments, the data mover device $306b_1$ may operate to transfer the first processing system context values 500a-500e from the processing system $306_1$ directly to the memory system 210 that provides the memory fabric. As such, the processing system $306_1$ may receive the request to move the process at block 402, and may generate the first data mover instructions similarly as described with reference to block 406, but with the exception that those first data mover instructions are to transmit the first processing system context values 500a-500e from the processing system $306_1$ directly to the memory system 210 that provides the memory fabric. As such, at block 408 the data mover device $306b_1$ may copy the first processing system context values 500a-500e from the processing system $306_1$ (i.e., from the CPU device registers/context value storage elements), and then transmit those first processing system context values 500a-500e to the switch device 208 for storage in the memory system 210.

The method then proceeds to block 410 where a second processing system in a second server device generates a second data mover instruction to retrieve the first processing system context values from the memory fabric. In an embodiment, at block 410, the processing system $306_2$ may operate to generate a second data mover instruction for the data mover device $306b_2$ that includes instructions to retrieve the first processing system context values 500a-500e that were provided on the memory system 210 that provides the memory fabric in the networked system 200 at block 408. In some embodiments, the coordination of the first processing system and second processing system may be determined by a higher level job scheduler subsystem, the operations of which one of skill in the art will recognize is akin to an operating system migrating a job to different CPU core, with the pushing and popping of context values akin to a loader program that switches context by pushing state information into the stack memory (a memory fabric in the case of the present disclosure), and popping the context from stack memory on a different processing system to resume the job. In a specific example, the second data mover instruction may be generated by the CPU device 306$a_2$ and may include a primitive instruction or other microarchitecture control signal such as, for example, a pop primitive instruction that may be provided as an enhancement to an Instruction Set Architecture (ISA) utilized by the processing system 306$_2$ and the data mover device 306$b_2$, although one of skill in the art in possession of the present disclosure will recognize that other second data mover instructions will fall within the scope of the present disclosure as well. Furthermore, in some embodiments of block 410, the processing system 306$_2$ may provide instruction(s) for the data mover device 306$b_2$ to retrieve process data that was utilized by the CPU device 306$a_1$ in providing the process and that was provided on the memory system 210 that provides the memory fabric in the networked system 200 at block 408. As such, in some embodiments, at block 410 the processing system 306$_2$ may provide one or more instructions to the data mover device 306$b_2$ to retrieve process data (sometimes referred to as "working data") and processing system context data from the memory system 210/memory fabric at substantially the same time.

Figure 5E:
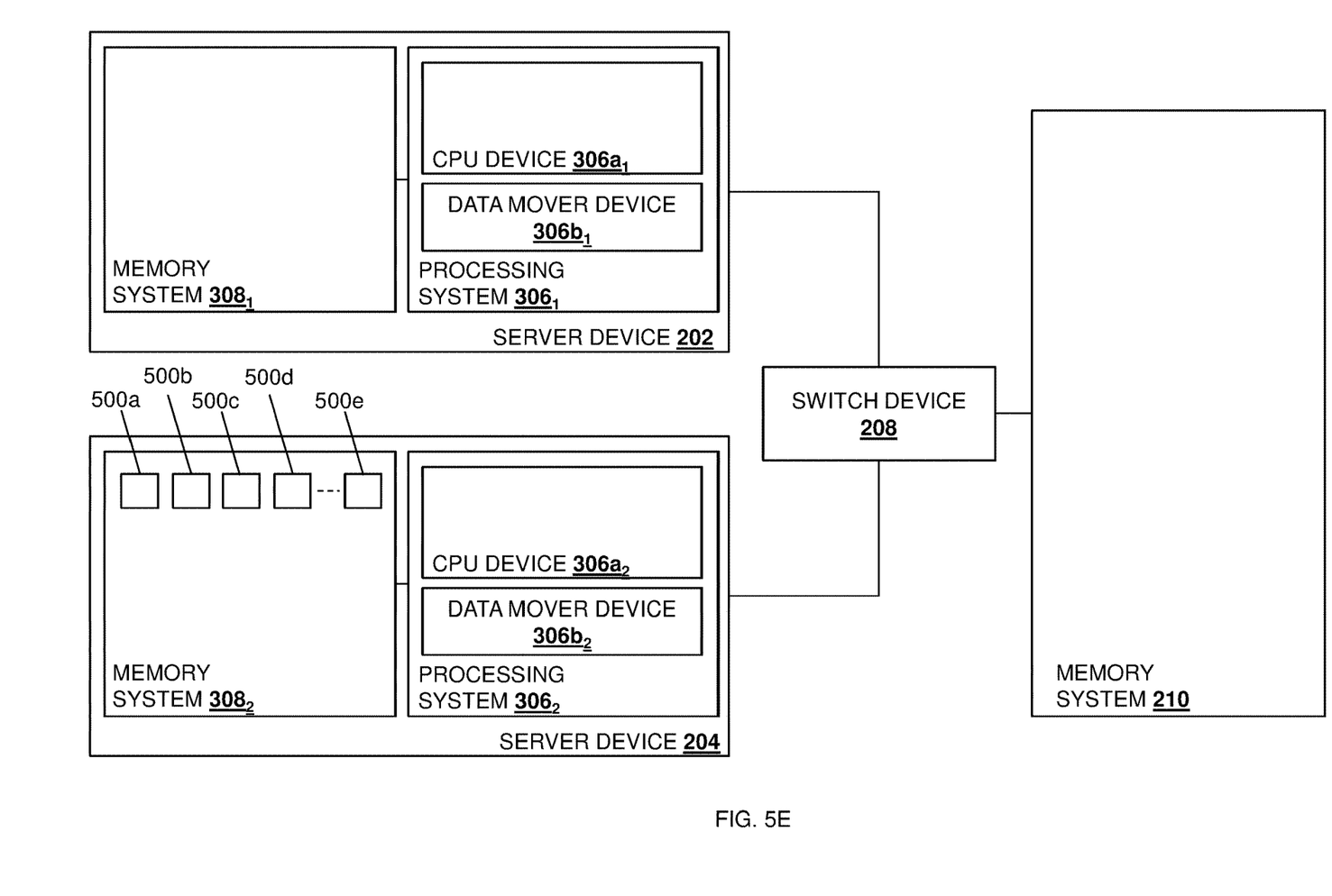
FIG. 5E is a schematic view illustrating an embodiment of the memory-fabric-based processor context switching system of FIG. 5A operating during the method of FIG. 4.

The method then proceeds to block 412 where a second data mover device in the second server device receives the second data mover instruction and retrieves the first processing system context values from the memory fabric and copies the first processing system context values to a second memory system in the second server device. As illustrated in FIG. 5E, in an embodiment of block 412, the data mover device 306$b_2$ may receive the second data mover instruction generated by the processing system 306$_2$ at block 410 and, in response, may retrieve the first processing system context values 500$a$-500$e$ from the memory system 210 that provides the memory fabric. For example, the data mover device 306$b_2$ may receive the primitive instruction or other microarchitecture control signal (e.g., the pop primitive instruction that may be provided as an enhancement to an Instruction Set Architecture (ISA) utilized by the processing system 306$_1$ and the data mover device 306$b_1$ discussed above) and, in response, may retrieve the first processing system context values 500$a$-500$e$ via the switch device 208 from the memory system 210 and store those first processing system context values 500$a$-500$e$ in the memory system 308$_2$.

Furthermore, as discussed above, in some embodiments of block 412, the data mover device 306$b_2$ may receive instructions from the processing system 306$_2$ to retrieve process data that was utilized by the CPU device 306$a_1$ in providing the process and that was provided in the memory system 210 that provides the memory fabric in the networked system 200 at block 408 and, in response, may retrieve the process data via the switch device 208 from the memory system 210 and store that process data in the memory system 308$_2$. As such, in some embodiments, at block 412 the data mover device 306$b_2$ may move process data (sometimes referred to as "working data") and processing system context data from the memory system 210/memory fabric to the memory system 308$_2$ at substantially the same time.

Figure 5F:
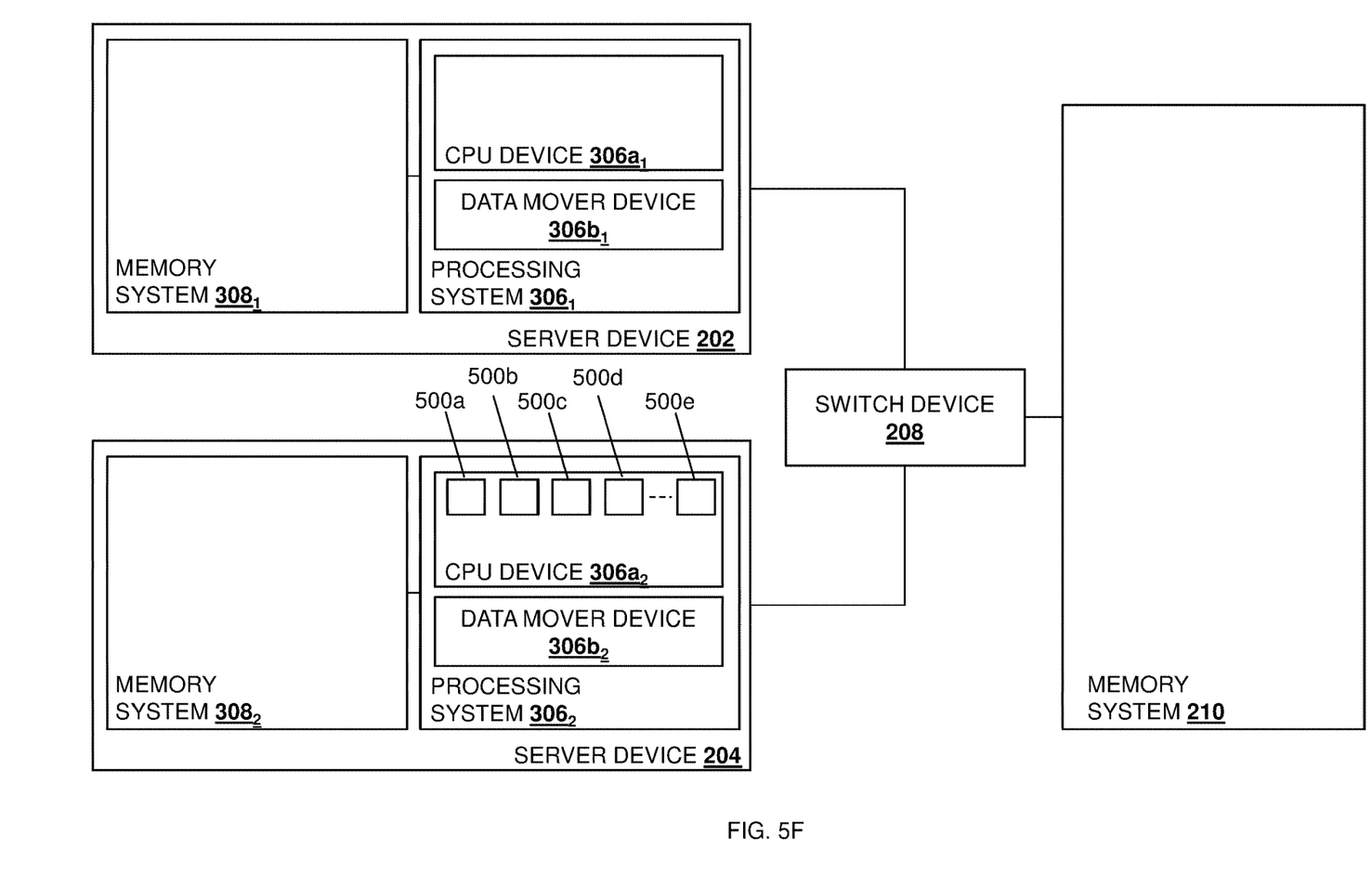
FIG. 5F is a schematic view illustrating an embodiment of the memory-fabric-based processor context switching system of FIG. 5A operating during the method of FIG. 4.

The method then proceeds to block 414 where the second processing system in the second server device retrieves the first processing system context values from the second memory system in the second server device. As illustrated in FIG. 5F, in an embodiment of block 414, the CPU device 306$a_2$ may retrieve the first processing system context values 500$a$-500$e$ that were stored in the memory system 308$_2$, and provide those first processing system context values 500$a$-500$e$ in the CPU device 306$a_2$. As such, at block 414, the CPU device 306$a_2$ may provide an instruction pointer (IP) context value included in the first processing system context values 500$a$-500$e$ in its instruction pointer (IP) context value storage element, an accumulator (AX) context value included in the first processing system context values 500$a$-500$e$ in its accumulator (AX) register, a base (BX) context value included in the first processing system context values 500$a$-500$e$ in its base (BX) register, a counter (CX) context value included in the first processing system context values 500$a$-500$e$ in its counter (CX) register, a data (DX) context value included in the first processing system context values 500$a$-500$e$ in its data (DX) register, a stack pointer (SP) context value included in the first processing system context values 500$a$-500$e$ in its stack pointer (SP) register, a stack base pointer (BP) context value included in the first processing system context values 500$a$-500$e$ in its stack base pointer (BP) register, a source index (SI) context value included in the first processing system context values 500$a$-500$e$ in its source index (SI) register, a destination index (DI) context value included in the first processing system context values 500$a$-500$e$ in its destination index (DI) register, a stack segment (SS) context value included in the first processing system context values 500$a$-500$e$ in its stack segment (SS) register, a code segment (CS) context value included in the first processing system context values 500$a$-500$e$ in its code segment (CS) register, a data segment (DS) context value included in the first processing system context values 500$a$-500$e$ in its data segment (DS) register, an extra segment (ES) context value included in the first processing system context values 500$a$-500$e$ in its extra segment (ES) register, an F segment (FS) context value included in the first processing system context values 500$a$-500$e$ in its F segment (FS) register, a G segment (GS) context value included in the first processing system context values 500$a$-500$e$ in its G segment (GS) register, a flags (EFLAGS) context value included in the first processing system context values 500$a$-500$e$ in its flags (EFLAGS) register, and/or may provide any other context values that would be apparent to one of skill in the art in possession of the present disclosure in its content registers.

One of skill in the art in possession of the present disclosure will recognize that the example discussed above with reference to FIGS. 5A-5F describes the transfer of CPU device context values between different CPU devices in different processing systems. However, one of skill in the art in possession of the present disclosure will recognize that the processing system context values may be transferred between different types of processing devices (e.g., CPU devices, GPU devices, accelerator devices, and/or any other processing devices that utilize context values). Furthermore, one of skill in the art in possession of the present disclosure will recognize that processing system context values moved from any particular processing system to the memory fabric according to the teachings of the present disclosure may be provided to any number of other processing systems while remaining within the scope of the present disclosure as well.

One of skill in the art in possession of the present disclosure will recognize that different processing devices may arrive at a common way of working with different types of context values which may involve compiler-based optimizations that utilize specific type of push and pop primitive instructions. For example, variations in push primitive instruction types may include:
Push(PUSHING_CONTEXT_FOR_GPU, context values)
Push(PUSHING_CONTEXT_FOR_FPGA, context values)
Push(PUSHING_CONTEXT_FOR_CPU, context values)

Similarly, variations in pop primitive instruction types may include:
Pop(POPPING_CONTEXT_FROM_CPU, context values)
Pop(POPPING_CONTEXT_FROM_GPU, context values)
Pop(POPPING_CONTEXT_FROM_FPGA, context values)

As will be appreciated by one of skill in the art in possession of the present disclosure, "push context for CPU context" may include pushing the register context and memory context. Similarly, "pushing for gpu context" may include translating current context values for a GPU kernel context (which is essentially equivalent to GPU kernel code and is optimized to run on a GPU (e.g.: using CUDA or OpenCL). Furthermore, in order to resume work in the GPU context, the CPU context values may need to be transformed, which may be assisted by the data mover device in combination with a source-to-source compiler.

While the data mover device $306b_2$ is discussed as transferring the first processing system context values $500a$-$500e$ from the memory system 210 that provides the memory fabric to memory system $308_2$ at block 412, and the processing system $306_2$ is described as retrieving the first processing system context value $500a$-$500e$ from the memory system $308_2$ for use in the processing system $306_2$ at block 414, in some embodiments the data mover device $306b_2$ may operate to transfer the first processing system context values $500a$-$500e$ from the memory system 210 that provides the memory fabric directly to the processing system $306_2$. As such, the processing system $306_2$ may generate the second data mover instructions similarly as described above with reference to block 410, with the exception that those second data mover instructions are to retrieve the first processing system context values $500a$-$500e$ from the memory system 210 that provides the memory fabric and provide them directly to the processing system $306_2$. As such, at block 412 the data mover device $306b_2$ may retrieve the first processing system context values $500a$-$500e$ via the switch device 208 and from the memory system 210 that provides the memory fabric, and then provide those first processing system context values $500a$-$500e$ directly in the processing system $306_2$ (i.e., in the CPU device registers/context value storage elements) similarly as described above as being performed by the processing system $306_2$ at block 414.

The method then proceeds to block 416 where the second processing system in the second server device executes the process using the first processing system context values retrieved from the second memory system in the second server device. In an embodiment, at block 416, the CPU device $306a_2$ may operate to execute the process that was being executed by the CPU device $306a_1$ at or prior to block 402 of the method 400. For example, the CPU device $306a_2$ may access process data that provides for the execution of the process, and utilize the instruction pointer (IP) context value (which was included in the first processing system context values $500a$-$500e$) in its instruction pointer (IP) context value storage element in order to return to a portion of the process data (e.g., the line of code at which the process was stopped at block 402) and resume the execution of the process according to any or all of the first processing system context values $500a$-$500e$ included in its context value registers. As discussed above, in some embodiments the accessing of the process data by the CPU device $306a_2$ at block 416 may include accessing process data that was copied to the memory system $308_2$ from the memory system 210 by the data mover device $306_2$. However, one of skill in the art in possession of the present disclosure will recognize that the process data may be made accessible to the CPU device $306a_2$ via a variety of techniques that would be apparent to one of skill in the art in possession of the present disclosure.

Thus, systems and methods have been described that provide for the switching of CPU context between CPUs by a data mover device and via a memory fabric. For example, a first CPU may be executing a process, and a request to move the process to a second CPU may be received. In response, the first CPU may copy its first CPU context to a first local memory system provided for the first CPU, and generate a first data mover instruction to transmit the first CPU context to a Gen-Z memory fabric. A first data mover device (included in the first CPU, coupled to the first CPU, etc.) may receive the first data mover instruction and, in response, may transmit the first CPU context from the first memory system to the Gen-Z memory fabric. A second CPU may then generate a second data mover instruction to retrieve the first CPU context from the memory fabric, and a second data mover device (included in the second CPU, coupled to the second CPU, etc.) may receive the second data mover instruction and, in response, may retrieve the first CPU context from the memory fabric and copy the first CPU context to a second memory system provided for the second CPU. The second CPU may then retrieve the first CPU context from the second memory system, and use the first CPU context to execute the process. As such, CPU context switching is provided via a memory fabric by data mover device(s) that offload many of the CPI context switching operations from the CPUs, thus providing for improved CPU context switching.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A memory-fabric-based processor context switching system, comprising:
    a memory fabric;
    a first server device that is coupled to the memory fabric and that includes:
        a first local memory system;
        a first processing system that is coupled to the first local memory system and that is configured to:
            receive a request to move a process executing on the first processing system and, in response:
                copy first processing system context values from respective processing system context value storage elements to the first local memory system; and generate, subsequent to the copying the first processing system context values from the respective processing system context value storage elements to the first local memory system, a first data mover instruction to move the first processing system context values to the memory fabric, wherein the first data mover instruction includes a push primitive instruction provided in a first Instruction Set Architecture (ISA) utilized by the first processing system; and a first data mover device that is configured to receive the first data mover instruction generated by the first processing system and, in response, move the first processing system context values from the first local memory system to the memory fabric, wherein the push primitive instruction included in the first data mover instruction is a cache flush instruction that causes the first data mover device to move the first processing system context values from the first local memory system to the memory fabric; and a second server device that is coupled to the memory fabric and that includes:

a second local memory system;

a second processing system that is coupled to the second local memory system and that is configured to generate a second data mover instruction to retrieve the first processing system context values from the memory fabric, wherein the second data mover instruction includes a pop primitive instruction provided in a second ISA utilized by the second processing system; and a second data mover device that is configured to receive the second data mover instruction generated by the second processing system and, in response, retrieve the first processing system context values from the memory fabric and provide the first processing system context values in the second local memory system.

2. The system of claim 1, wherein the second processing system is configured to:

provide the first processing system context values from the second local memory system in the second processing system; and execute, using the first processing system context values provided in the second processing system, the process.

3. The system of claim 1, wherein the first data mover device is included in the first processing system, and wherein the second data mover device is included in the second processing system.

4. The system of claim 1, wherein the first data mover device is configured to move, in response to receiving the first data mover instruction, process data associated with the execution of the process to the memory fabric, and wherein the second data mover device is configured to retrieve, in response to receiving the second data mover instruction, the process data from the memory fabric and provide the process data in the second local memory system.

5. An Information Handling System (IHS), comprising:

a memory system;

a processing system that is coupled to the memory system and that is configured to receive a first request to move a first process executing on the processing system and, in response:

copy first processing system context values from respective processing system context value storage elements to the memory system; and generate, subsequent to the copying the first processing system context values from the respective processing system context value storage elements to the first local memory system, a first data mover instruction to move the first processing system context values to a memory fabric, wherein the first data mover instruction includes a push primitive instruction provided in a first Instruction Set Architecture (ISA) utilized by the first processing system; and a data mover device that is configured to receive the first data mover instruction generated by the processing system and, in response, move the first processing system context values from the memory system to the memory fabric, wherein the push primitive instruction included in the first data mover instruction is a cache flush instruction that causes the data mover device to move the first processing system context values from the memory system to the memory fabric.

6. The IHS of claim 5, wherein processing system is configured to:

generate a second data mover instruction to retrieve second processing system context values from the memory fabric, wherein the data mover device is configured to:

receive the second data mover instruction generated by the processing system and, in response, retrieve the second processing system context values from the memory fabric and provide the second processing system context values in the memory system.

7. The IHS of claim 6, wherein the processing system is configured to:

provide the second processing system context values from the memory system in the processing system;

execute, using the second processing system context values provided in the processing system, a second process.

8. The IHS of claim 5, wherein the data mover device is included in the processing system.

9. The IHS of claim 5, wherein the data mover device is configured to move, in response to receiving the first data mover instruction, first process data associated with the execution of the first process to the memory fabric.

10. A method for switching processor context via a memory fabric, comprising:

receiving, by a processing system that is included in a server device, a first request to move a first process executing on the processing system;

copying, by the processing system in response to receive the first request, first processing system context values from respective processing system context value storage elements to the memory system; and generating, by the processing system in response to receive the first request and subsequent to the copying the first processing system context values from the respective processing system context value storage elements to the first local memory system, a first data mover instruction to transmit the first processing system context values to a memory fabric, wherein the first data mover instruction includes a push primitive instruction provided in a first Instruction Set Architecture (ISA) utilized by the first processing system;

receiving, by a data mover device that is included in the server device, the first data mover instruction generated by the processing system; and moving, by the data mover device in response to receiving the first data mover instruction, the first processing system context values from the memory system to the memory fabric, wherein the push primitive instruction included in the first data mover instruction is a cache flush instruction that causes the data mover device to move the first processing system context values from the memory system to the memory fabric.

11. The method of claim 10, further comprising:

generating, by the processing system, a second data mover instruction to retrieve second processing system context values from the memory fabric;

receiving, by the data mover device, the second data mover instruction generated by the processing system; and retrieving, by the data mover device in response to receiving the second data mover instruction, the second processing system context values from the memory fabric and providing the second processing system context values in the memory system.

12. The method of claim 11, further comprising:

providing, by the processing system, the second processing system context values from the memory system in the processing system;

executing, by the processing system using the second processing system context values provided in the processing system, a second process.

13. The method of claim 10, wherein the data mover device is included in the processing system.

14. The method of claim 10, further comprising:

moving, by the data mover device in response to receiving the first data mover instruction, first process data associated with the execution of the first process to the memory fabric.

\* \* \* \* \*